(12) United States Patent
Broere et al.

(10) Patent No.: US 10,859,377 B2
(45) Date of Patent: Dec. 8, 2020

(54) METHOD FOR IMPROVING POSITION INFORMATION ASSOCIATED WITH A COLLECTION OF IMAGES

(71) Applicant: CycloMedia Technology B.V., Zaltbommel (NL)

(72) Inventors: Jonathan Emmanuel Allan Broere, Rosmalen (NL); Arjen Swart, Waardenburg (NL); Cornelis Willem Johannes Immanuël Spoel, Amerongen (NL); Bart Johannes Beers, Rumpt (NL)

(73) Assignee: CycloMedia Technology B.V., Zaltbommel (NL)

( * ) Notice: Subject to any disclaimer, the term of this patent is extended or adjusted under 35 U.S.C. 154(b) by 99 days.

(21) Appl. No.: 16/097,347

(22) PCT Filed: May 2, 2017

(86) PCT No.: PCT/NL2017/050277
§ 371 (c)(1),
(2) Date: Oct. 29, 2018

(87) PCT Pub. No.: WO2017/192034
PCT Pub. Date: Nov. 9, 2017

(65) Prior Publication Data
US 2019/0137269 A1 May 9, 2019

(30) Foreign Application Priority Data

May 2, 2016 (NL) .................................. 2016718

(51) Int. Cl.
*G01C 11/06* (2006.01)
*G06T 7/73* (2017.01)
(Continued)

(52) U.S. Cl.
CPC ................ *G01C 11/06* (2013.01); *B60R 1/00* (2013.01); *G01C 11/34* (2013.01); *G06T 7/73* (2017.01);
(Continued)

(58) Field of Classification Search
CPC ......... G01C 11/06; G01C 11/34; G06T 17/05; G06T 7/73; G06T 2207/30241; B60R 1/00; B60R 2300/607
(Continued)

(56) References Cited

U.S. PATENT DOCUMENTS 6,172,601 B1   1/2001 Wada et al.
7,912,296 B1 * 3/2011 Zelinka .................. G01C 21/00
                                                  345/626
(Continued)

OTHER PUBLICATIONS

Cipolla et al., "Structure from motion", Practical Image Processing and Computer Vision, 2009, Chapter 13, Wiley, Hoboken, New Jersey.
(Continued)

*Primary Examiner* — Jerome Grant, II
(74) *Attorney, Agent, or Firm* — The Webb Law Firm

(57) ABSTRACT

A method and system for improving position information associated with a collection of images is disclosed, more in particular, a method and system for improving position information of images obtained using a camera system including at least one camera mounted on or to a vehicle. A 3D model is constructed from an overlapping region in which at least two images obtained at different positions of the vehicle among the collection of images at least partially overlap. By comparing the 3D model to an aerial image, the position of the 3D model can be updated.

19 Claims, 5 Drawing Sheets

(51) Int. Cl.
*B60R 1/00* (2006.01)
*G01C 11/34* (2006.01)
*G06T 17/05* (2011.01)

(52) U.S. Cl.
CPC ........ *G06T 17/05* (2013.01); *B60R 2300/607* (2013.01); *G06T 2207/30241* (2013.01)

(58) Field of Classification Search
USPC ........................................................ 382/154
See application file for complete search history.

(56) References Cited

U.S. PATENT DOCUMENTS

| | | |
|---|---|---|
| 2011/0282578 A1 | 11/2011 | Miksa et al. |
| 2013/0009950 A1* | 1/2013 | Ben-David ............. G06T 15/04 345/419 |
| 2015/0347872 A1* | 12/2015 | Taylor ...................... G06T 7/11 382/224 |
| 2016/0198088 A1* | 7/2016 | Wang ................... H04N 5/2328 348/36 |
| 2017/0337824 A1* | 11/2017 | Chen .................... G05D 1/0202 |
| 2018/0157911 A1* | 6/2018 | Lo ............................. G06T 7/73 |
| 2019/0113349 A1* | 4/2019 | Lavu ....................... G01C 21/206 |
| 2019/0162551 A1* | 5/2019 | Kean ....................... G06F 16/51 |
| 2019/0361457 A1* | 11/2019 | Johnson ................. B63H 25/00 |
| 2020/0255143 A1* | 8/2020 | Liang ................. H04N 5/23206 |

OTHER PUBLICATIONS

Tournaire et al., "Towards a Sub-Decimetric Georeferencing of Ground-Based Mobile Mapping Systems in Urban Areas: Matching Ground-Based and Aerial-Based Imagery Using Roadmarks", Revue Francaise de Photogrammetrie et de Teledetection, 2015, pp. 84-89, vol. 36, Issue 185.

\* cited by examiner

METHOD FOR IMPROVING POSITION INFORMATION ASSOCIATED WITH A COLLECTION OF IMAGES

CROSS-REFERENCE TO RELATED APPLICATION

This application is the United States national phase of International Application No. PCT/NL2017/050277 filed May 2, 2017, and claims priority to Dutch Patent Application No. 2016718 filed May 2, 2016, the disclosures of which are hereby incorporated in their entirety by reference.

BACKGROUND OF THE INVENTION

Field of the Invention

The present invention is related to a method and system for improving position information that is associated with a collection of images. More in particular, the present invention is related to a method and system for improving position information associated with images that have been obtained using a camera system comprising at least one camera mounted on or to a vehicle.

Description of Related Art

Nowadays, much information of the real-world is captured using vehicle-mounted camera systems. For instance, a vehicle, such as a car, may be equipped with a plurality of cameras to capture a plurality of images while it drives across the streets in a region to be characterized. These images can then be processed to construct a panoramic image, providing graphical information of the surroundings of a given viewpoint.

Within the context of the present invention, a panoramic image is an image having an elongated field of view. The present invention is particularly related to panoramic images that provide a field of view that extends completely, i.e. 360 degrees, around a particular view point. Such images are typically acquired using a plurality of cameras of which the resulting images show a marginal overlap to facilitate the stitching process to construct the panoramic image from the plurality of images.

By associating the constructed panoramic image with a position of the vehicle at the time of capturing the underlying images it becomes possible to associate the constructed panoramic images with navigational data. As an example, a user may enter an address in a navigational system, after which the navigational system will translate the address in position information, such as coordinates, and it will output the panoramic image that is associated with this position information to the user.

The panoramic images can be used for other purposes than merely grasping an impression of the surroundings of a defined point or address. For example, these images can be used to perform remote measurements, such as determining the width and length of objects and/or to determine the location of such objects. It should be apparent that for such applications it is very important that the position information associated with these images is as accurate as possible.

It is a well known fact that it is difficult to obtain accurate positioning information in urban areas. For instance, GPS data may be disturbed due to multipath phenomena caused by reflections at buildings or other objects. Consequently, the position information associated with the panoramic images in these areas may be incorrect. As such it becomes difficult to for instance accurately determine the location of objects in a panoramic image.

In the paper "Towards a sub-decimetric georeferencing of ground-based mobile mapping systems in urban areas: Matching ground-based and aerial-based imagery using road marks", by Tournaire at al. published in the Revue Francaise de Photogrammetrie et de Teledetection May 2012; 36(185), a solution for this problem is proposed. It is proposed to use a pair of vehicle-mounted cameras that are arranged using a stereoscopic baseline. These cameras are used to capture images of road marks, such as a zebra crossing. Using the stereoscopic setup it is possible to obtain depth information of these road marks provided that these marks are visible in each image obtained by the pair of cameras. A 3D model of the road mark can then be constructed. To this end, positional data, such as GPS data, is used to determine an absolute position of the road mark.

The paper further proposes to use aerial images in which these same road marks have been imaged. These aerial images are also associated with positional data, such as GPS data. It is known that the positional data obtained in the air is more accurate than ground-based GPS data due to the absence of the multi-path phenomenon and due to the fact that GPS signals are less susceptible to being blocked by objects.

To improve the positional data of the ground-based images, the paper proposes to match the 3D model of the road mark to the aerial images. To this end, a fictional aerial image of the road mark is created using the 3D model. This image is compared to the various aerial images. By varying a positional offset of the 3D model, the match between the fictional aerial image and the actual aerial images can be optimized.

A drawback of the abovementioned solution is that it requires a significant overlap in the ground-based images as the object to be modelled must be fully captured. Moreover, this solution requires the individual images to be available. In most collections of panoramic images, the underlying images that have been used to construct the panoramic images are not available, thereby rendering the proposed solution inapplicable.

A further drawback is related to the fact that only relatively small objects can be used. In the aerial images, such objects are relatively small. It is therefore very difficult to reliably achieve the desired accuracy. Moreover, in many circumstances road marks are not available.

SUMMARY OF THE INVENTION

An object of the present invention is to provide a solution to this problem. According to a first aspect, this object is achieved using a method for improving position information associated with a collection of images, wherein the method comprises forming a collection of images using the steps of providing a vehicle having a vehicle-mounted camera and moving the vehicle along a given trajectory while obtaining respective images at different positions of the vehicle along the trajectory, each of the obtained images being associated with a respective first position and respective first orientation, representing a position and orientation of the camera with which the image was taken.

According to the invention, the method further comprises determining an overlapping region in which at least two images obtained at different positions of the vehicle among the collection of images at least partially overlap. Hence, compared to the abovementioned disclosure of Tournaire, the present invention does not rely on two or more cameras that have a fixed position relative to each other. According to the invention, the required overlap is obtained using two images taken, preferably by the same camera, along different positions along a given trajectory.

As a next step, a 3D model of the overlapping region is constructed using triangulation. A well known example of triangulation is an intersection technique. According to the invention, the position and orientation of the camera is known at the time of obtaining the at least two images. This allows a distance to be computed from one of the positions of the camera associated with one among the at least two images, to an object visible in the overlapping region. In this manner, a 3D model can be constructed that comprises a representation for the physical objects that are visible in the overlapping region.

In practice, images are obtained at positions along the trajectory that are spaced apart with a relatively small separation between them. Consequently, the overlapping region between adjacent images is rather large allowing most of the physical objects surrounding the camera to be modelled in the 3D model.

As a next step, an aerial image is provided in which the overlapping region is at least partially visible, the aerial image being associated with a second position and second orientation representing a position and orientation of a camera with which the image was taken. According to the invention, the overlapping region need not be fully visible in the aerial image, although this may be preferred. Even if the overlapping region is only partially visible, suitable correction may still be performed.

The aerial image allows a positional offset to be determined of the 3D model relative to the aerial image. This positional offset reflects an offset in the position for each physical object modelled in the 3D model to the actual position of that object in real space. Although the positional offset is mainly related to a translational offset, the invention does not exclude that the positional offset further includes a rotational offset.

As a final step, the respective first positions of the images in the collection are updated using the determined positional offset.

According to the invention, the overlapping region comprises a first overlap between a first pair of images that correspond to adjacent positions of the vehicle along the trajectory, a second overlap between a second pair of images, different from the first pair of images, that correspond to adjacent positions of the vehicle along the trajectory, wherein the first overlap partially overlaps the second overlap. For example, a first image may show objects A, B, C, D, wherein the order of the objects corresponds to the direction of propagation of the vehicle. Similarly, a second image may show objects B, C, D, E, whereas a third and fourth image show objects C, D, E, F and D, E, F, G, respectively. In this case, the first pair, comprising the first and second images, has a first overlap in which objects B, C, and D are visible. Similarly, the second pair, comprising the third and fourth images, has a second overlap in which objects D, E, and F are visible. Hence, the first overlap partially overlaps the second overlap. In this region, object D is visible. In this manner, the overlapping region may be constructed using a large chain of images, wherein each image, apart from the first and last image, overlaps with an image taken upstream and downstream relative to that image. This allows a very large overlapping region to be formed, thereby increasing the accuracy with which the position information of the various images can be improved.

In the example above, the second pair could have equally related to the second and third image, as will be exemplified later in FIG. 2. In that case, objects C, D, and E would be visible in the second overlap. Also in this case, the first overlap partially overlaps the second overlap as object C and D would be visible in both overlaps. In this way, the overlapping region can be formed as a large continuous structure of overlaps. The use of a large continuous structure of overlaps presents the advantage that, unlike with the abovementioned prior art, no ab initio knowledge is required with respect to the objects that are used for improving the position information of the image. Furthermore, according to the present invention, it becomes possible to use large 3D models making the correction of the positions of the underlying images in the collection less prone to errors. The updating of the positional information using the aerial images can therefore be performed more reliably.

The method may further comprise determining, using a first positioning system, the position of the vehicle-mounted camera while moving the vehicle along the trajectory, and determining, using a second positioning system, the position of the camera that is used to obtain the aerial image. Typically, the vehicle moves along the trajectory while taking pictures of the surroundings. Although in some cases the vehicle may be stationary, e.g. when waiting in front of traffic lights, the invention is particularly useful for applications wherein the vehicle continuously moves without having to pay much attention to the surroundings. This is due to the fact that the object(s) that are used to improve the position information are readily available and do not require a specific positioning of the vehicle.

The first positioning system and/or the second positioning system may comprise at least one of a global navigation satellite system (GNSS) system, an inertial navigation system, and a vehicle wheel rotation measurement system. As an example the known GPS system may be used.

As the vehicle generally moves in urban areas, the first positioning system may suffer from reduced accuracy when compared to the second positioning system. For instance, in the case of GPS, the required satellite signals may be distorted or reflected by buildings. These effects, which are well known in the art, are not or not as much encountered when acquiring aerial images using an airborne vehicle, such as an airplane.

The overlapping region preferably comprises a road or ground on which the vehicle having the vehicle-mounted camera has been moving. In addition, the overlapping region may further comprise building facades.

Constructing the 3D model may comprise identifying a corresponding image element in at least two images among the collection of images, determining a position of the identified image element using triangulation based on the respective first positions and first orientations associated with the at least two images, assigning the identified image element to one or more vertices of a mesh, and assigning a texture or color to vertices of the mesh or to polygons of the mesh using the texture and/or color of the corresponding image element.

Triangulation is a well known technique by which a distance can be determined using two images that show an overlap. To this end, a pair of cameras is normally mounted in a fixed relationship to each other. Then, the shortest distance between the object corresponding to the image element and the mathematical connecting line between the two cameras can be determined based on the distance between the two cameras, and the orientations of the cameras. More in particular, the distance to a point on the object can be determined using the distance between the entrance pupils of the cameras and the angles between the connecting line and a line from a respective entrance pupil to a point on the object. The images taken by these cameras are generally acquired simultaneously.

Contrary to this known technique, the present invention proposes to use images that are obtained at different times, but generally with the same camera. Moreover, the distance between the entrance pupils may be different for different pairs of images.

In general, at least two cameras are mounted on or to the vehicle. One wide-angle camera is oriented to the left relative to the vehicle, and one wide-angle camera is oriented to the right relative to the vehicle. In general, the images acquired by these cameras displays a small overlap. This overlap can be used during the stitching process when generating a panoramic image from the two images. Although this overlap may equally be used, it is less suited for generating a large overlapping region. More in particular, the overlap between these images for a given position may not overlap the overlapping region between images at an adjacent position. This situation may for instance occur when the vehicle makes a sharp turn.

Determining the positional offset may comprise the steps of assigning a temporary positional offset to the 3D model, constructing a fictional aerial image using the 3D model based on the second position and second orientation, determining a first difference between the fictional aerial image and the aerial image, calculating an error based on the determined first difference, changing the temporary positional offset and repeating the previous steps until the error is below a predefined threshold and/or until a global or local minimum for the error is found, and setting the resulting temporary positional offset as the positional offset of the 3D model.

For example, the 3D model as a whole may be assigned a temporary positional offset, e.g. (0, 0, 0), representing an offset of 0 meters in the x, y, and z direction. Next, a fictional aerial image can be constructed. This aerial image corresponds to the image that would have been obtained if the relevant camera was at the second position and had the second orientation. A first difference can then be determined between the fictional image and the actual aerial image, both images corresponding to the same second position and orientation. These differences may be the result of the color and/or intensities of the images being unequal due to the fact that when generating the fictional aerial image the exact lighting conditions of the actual image cannot be reproduced or simulated. However, the largest contribution to the differences found is related to the positional shift between the fictional and actual aerial images. Based on the differences, an error can be computed. As an example, the error may correspond to the average shift between the fictional and actual aerial image. In case the position information of the images and the aerial image is perfect, little to no shift will be found. However, in practice, the position information of the ground-based images is prone to be less accurate.

As a next step, a different value for the positional offset of the 3D model can be tried. This process is repeated until the error is below a predefined threshold. The process of updating the positional offset may depend on the shift found. For instance, information regarding the direction in which the images are shifted relative to each other may be used to update the positional offset.

Alternatively, determining the positional offset may comprise assigning a temporary positional offset to the 3D model, projecting the aerial image onto the 3D model, determining a first difference between the projected aerial image and the 3D model, calculating an error based on the determined first difference, changing the temporary positional offset and repeating the previous steps until the error is below a predefined threshold and/or until a global or local minimum for the error is found, and setting the resulting temporary positional offset as the positional offset of the 3D model.

In this last approach, the actual aerial image is projected onto the 3D model. The actual 3D model comprises a polygon mesh having a number of vertices and faces, wherein a color is assigned to the vertices and/or faces. By projecting the actual aerial image onto the 3D model, fictional color information of the vertices and/or faces can be found. By comparing the actual and fictional color information, differences can be identified that can be used to compute an error. Also in this case, a shift may be identified.

The abovementioned steps are advantageously performed using a plurality of aerial images. For example, these steps can be performed for each aerial image separately, wherein the error is computed based on the respective differences found for each aerial image.

More in particular, the step of constructing a fictional aerial image using the 3D model based on the second position and second orientation or the step of projecting the aerial image onto the 3D model can be performed for each of the plurality of aerial images. Moreover, the step of determining a difference between the fictional aerial image and the aerial image or the step of determining a difference between the projected aerial image and the 3D model may be performed for each of the aerial images, and wherein the error is calculated based on the accumulated first differences.

Determining the positional offset may further comprise selecting one aerial image among the aerial images as a reference aerial image, and projecting the reference aerial image via the 3D model into the other aerial images to construct one or more projected images or projecting the other aerial images via the 3D model in the reference aerial image to construct one or more projected images. Then, a respective second difference is determined between each of the projected images and the image that was projected into. In this case, calculating an error may comprise calculating an error based on the accumulated determined first and second differences.

The images in the collection of images may be panoramic images, having a field of view of 180 degrees or higher in the horizontal plane.

When the vehicle travels along the trajectory, each acquired image is associated with a position of the camera or car at the time of recording that image. It may be that accurate GPS information is not available for each position. In such case, inertial sensors or other techniques may be used to find the positions to be associated with images that are obtained at positions for which an accurate GPS signal was unavailable.

Moreover, apart from requiring an absolute accuracy of the various positions associated with the various images, it is also required that these positions match in a relative sense. This latter aspect relates to the fact that in a sequence of n images, each image may have a similar offset relative to an aerial image, but the differences in positions between the various images is geometrically correct. To improve these relative positions associated with the images, it is preferred to perform a bundle adjustment on the images in the collection prior to constructing the 3D model. Bundle adjustment techniques are known in the art.

According to a second aspect, the present invention further relates to a method for improving position information associated with a collection of images, wherein the images in the collection have been obtained using a camera that was positioned at different positions along a trajectory, each of the obtained images being associated with a respective first position and respective first orientation, representing a position and orientation of the camera with which the image was taken.

This method comprises determining an overlapping region in which at least two images obtained at different positions among the collection of images at least partially overlap, constructing a 3D model of the overlapping region using triangulation, and providing an aerial image in which the overlapping region is at least partially visible, the aerial image being associated with a second position and second orientation representing a position and orientation of a camera with which the image was taken.

This method further comprises determining a positional offset of the 3D model by matching the 3D model to the aerial image, and updating the respective first positions of the collection of images using the determined positional offset.

Hence, the invention can be equally applied to an existing collection of images provided that at least one corresponding aerial image is available and that each image is associated with a given position and orientation.

The invention further provides a device for implementing the method as defined above. This device comprises a memory for holding the collection of images and said at least one aerial image, and a processor that is configured to perform the method as described above.

In addition, the invention relates to a data carrier on which computer readable instructions are stored which, when executed by a computer, cause the execution of the method as defined above.

BRIEF DESCRIPTION OF THE DRAWING

Next, the invention will be described in more detail referring to the appended drawings, wherein.

DESCRIPTION OF THE INVENTION

Figure 1:
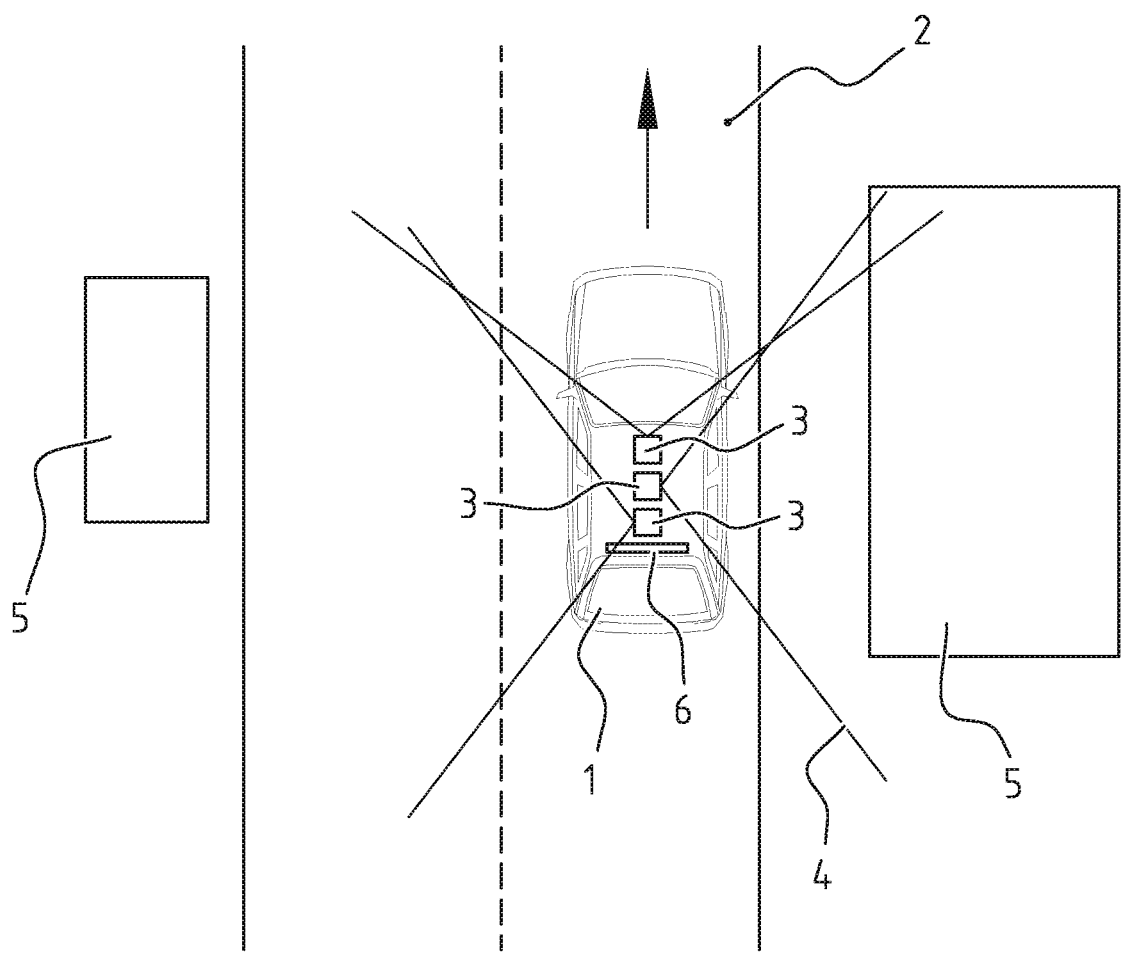
FIG. 1 illustrates the known concept of recording images of the surroundings using a moving vehicle.

FIG. 1 illustrates a known concept of recording images of the surroundings using a moving vehicle. In this figure, a vehicle, such as a car 1, is driving on a road 2. On the roof of car 1, several wide-angle cameras 3 are mounted. Each camera has its field of view 4 with which it is able to record images of the surroundings of car 1. In FIG. 1, each camera records at least a part of road 2 and possible buildings 5. It should be clear to the skilled person that cameras 3 may record a large variety of objects and that the present invention is not limited to any particular object, to the number of cameras used, and/or to the positioning of camera's on or in car 1. However, the present invention is particularly directed to recording images that display objects which are also visible in aerial images. Examples of such objects are roads and building facades.

Car 1 normally drives along a given trajectory while recording images at various spaced apart positions along the trajectory. As an example, cameras 3 may be triggered by a positioning system 6 that is provided in car 1 to obtain an image each time that car 1 has moved a predefined distance. This distance may depend on whether car 1 moves in a straight line or whether car 1 takes a turn. In the latter case, cameras 3 may be triggered more often.

Alternatively, it is advantageous to mount camera's 3 one behind the other when seen in a direction of transport that corresponds to car 1 driving straight. This arrangement is shown in FIG. 1. By properly triggering camera's 3 while car 1 is moving, it an be achieved that the entrance pupils of camera's 3 at the time of recording the respective images all correspond to substantially the same absolute position. This reduces parallax errors and improves the geometrical correctness when constructing panoramic images from the individual images recorded by camera's 3.

As an example, positioning system 6 of car 1 may comprise a global navigation satellite system (GNSS) system, such as GPS, an inertial navigation system, and/or a vehicle wheel rotation measurement system. Positioning system 6 is used to determine a position of car 1 at the time of recording the images. Each recorded image can therefore be associated with a position. This position may be corrected to account for the position of cameras 3 relative to car 1. For instance, the position of car 1 may correspond to the position of the antenna(s) used for acquiring the GPS signals. The position of these antennas relative to cameras 3 is known or can be determined. The position determined by the GPS system can therefore be corrected in such a manner that the position refers to the position of the cameras 3. Similarly, each image can be associated with a given orientation of camera 3. This orientation may also be determined indirectly. For instance, the orientation of car 1, such as the driving direction, can be determined using a global navigation satellite system and/or an inertial navigation system INS system. The orientation of camera 3 can be determined because camera 3 is fixedly mounted to car 1 in a known manner.

As described above, car 1 moves along a certain trajectory while obtaining respective images at different positions of the vehicle along the trajectory, each of the obtained images being associated with a respective position and respective orientation, representing a position and orientation of the camera with which the image was taken. These images can be combined to form a collection of images.

FIG. 1 illustrates that a further camera 3' can be mounted on the roof of car 1. As shown, the field of view of this camera overlaps with the field of view of cameras 3. As such, the images from cameras 3 and 3' can be combined into a single panoramic image having a field of view that extends up to 270 degrees in the horizontal plane. By adding an additional camera that is directed to the back of car 1, the field of view of the resulting panoramic image can be extended up to 360 degrees.

Figure 2:
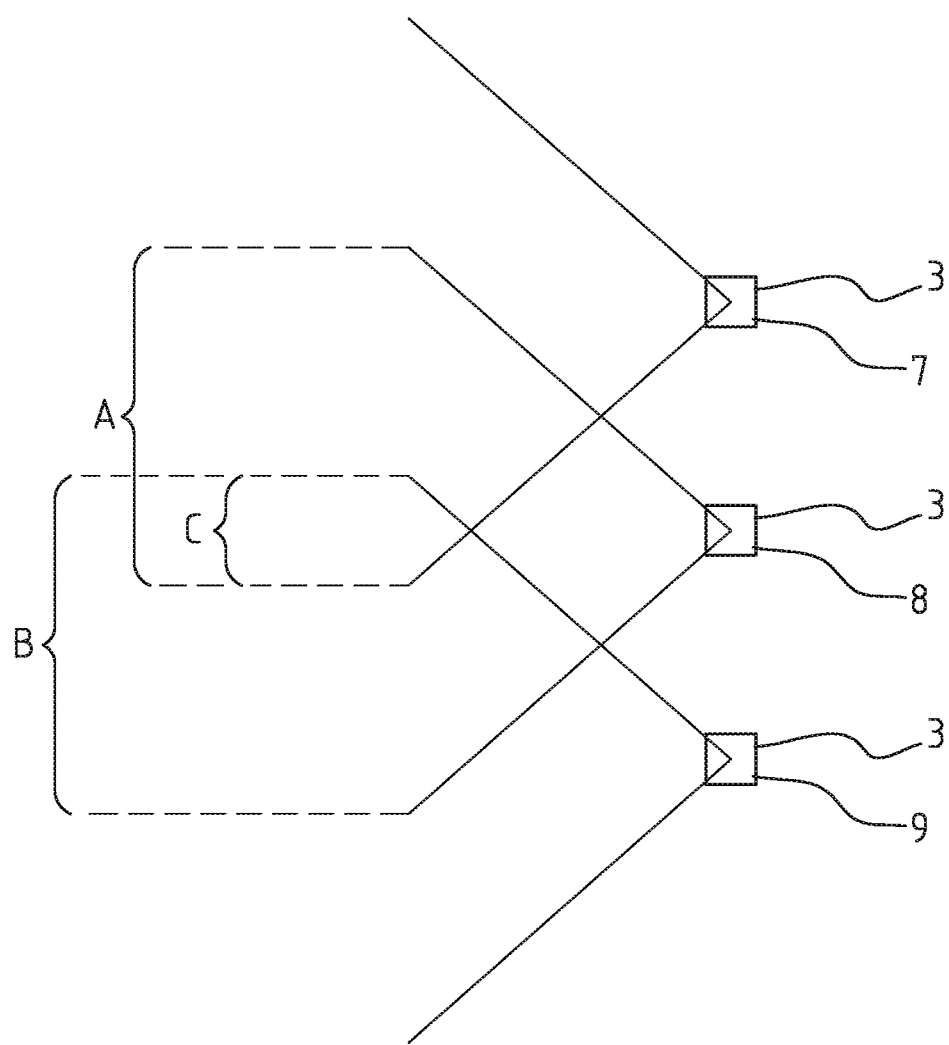
FIG. 2 illustrates constructing the overlapping region that is used in the present invention.

FIG. 2 illustrates vehicle-mounted camera 3 at different positions 7, 8, 9 (and times) along the trajectory of car 1. In the images obtained by camera 3 at positions 7, 8, and 9, three different regions can be identified: region A in which the images corresponding to positions 7 and 8 overlap, region B in which the images corresponding to positions 8 and 9 overlap, and a region C in which regions A and B overlap. The skilled person may appreciate that by moving vehicle 1 and taking images at appropriate distances, a large continuous overlapping region can be constructed, wherein at least two images corresponding to different positions at least partially overlap.

The overlapping region in the images comprises graphical information about corresponding objects that are present in the surroundings. For instance, the images may comprise color information.

Figure 3:
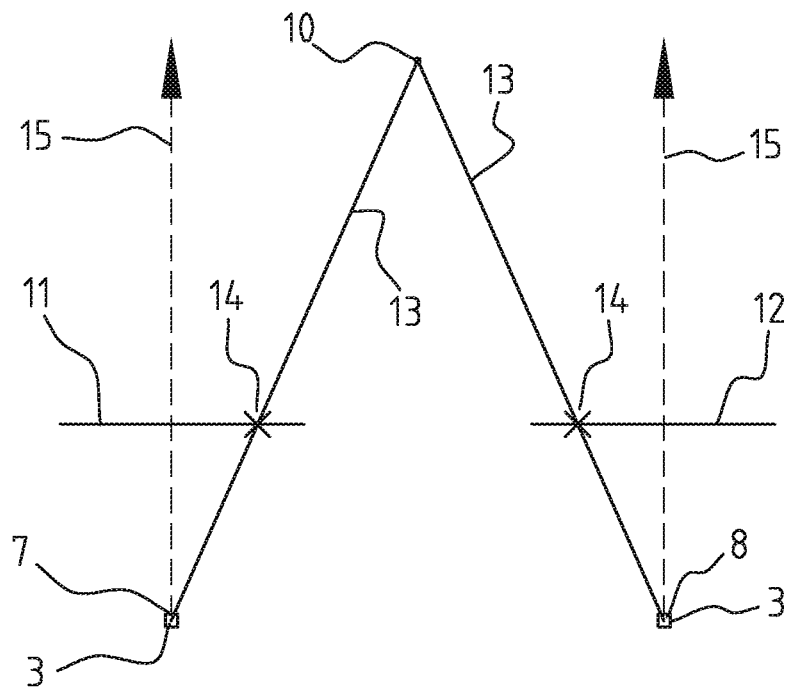
FIG. 3 illustrates how the position of image elements in the overlapping region is determined.

As a next step, the position of the objects in the overlapping region relative to some origin needs to be determined. This process is known and an example thereof is illustrated in FIG. 3. This example illustrates determining the position of an object 10 in region A using images 11, 12 obtained by camera 3 at positions 7 and 8, respectively. Here, lines 13 correspond to lines from camera 3, i.e. the entrance pupil thereof, at positions 7 and 8 through a representation 14 of object 10 in images 11, 12. These lines ideally cross at the position of object 10. The orientation of camera 3, illustrated by lines 15, is known as well as the distance between positions 7 and 8. Consequently, the position of object 10 relative to any of the positions 7 and 8 can be determined using known triangulation techniques.

The abovementioned triangulation technique is used to construct a 3D model of the various objects that are visible in the overlapping region. Here, a 3D model comprises a plurality of vertices that are connected using edges. Such model defines a plurality of faces.

Each vertex normally corresponds to a point on an object for which a position has been determined. In an exemplary embodiment, a position is determined for each pixel in the overlapping region. In other embodiments, the overlapping region is searched for characterizing features, such as edges of objects. The points for which the position is determined correspond to these characterizing features. In this manner, a position does not need to be determined for every pixel in the overlapping region. In addition, the overlapping region may be filtered prior to determining position information for objects visible in the overlapping region. As an example, the overlapping region may be searched to determine the presence of objects that are positioned in a certain range relative to camera 4. This would allow the exclusion of remote objects, such as the sky. Additionally or alternatively, filtering may be performed based on color information or on specific viewing angles both in the vertical and horizontal direction.

The 3D model can be provided with color. As an example, each vertex may be associated with color information that corresponds to the color information of the corresponding point(s) in the images that were used during the triangulation. The faces of the 3D model may then be associated with a color based on the color information of the corresponding vertices. Normally, the colors associated with the different vertices are different. In such case, and average color may be determined or a gradient may be applied to the face that corresponds to the vertices. In other embodiments, color information is directly associated with the faces of the 3D model.

In addition to images obtained using vehicle-mounted cameras 3, aerial images are acquired. These images are for instance obtained using cameras that are mounted to an airplane. Again, each acquired image is associated with a position and orientation, which correspond to the camera position and orientation, respectively, of the camera that was used to acquired the image in question. To that end, the airplane may be provided with a positioning system, such as a GPS system. Due to the absence of obstacles in the air, the satellite signals required for proper GPS operation are received with less distortion when compared to ground based GPS system, such as the GPS system used in the previously mentioned vehicle. Consequently, the accuracy of the position and orientation information obtained from the positioning system that is provided in the airplane is higher than that of the ground-based positioning system.

Given the above, the position and orientation information associated with the aerial images can be taken as a reference. According to the invention, this information can be used to improve the position information associated with the ground-based images. To this end, the 3D model is compared to the aerial images.

Figure 4:
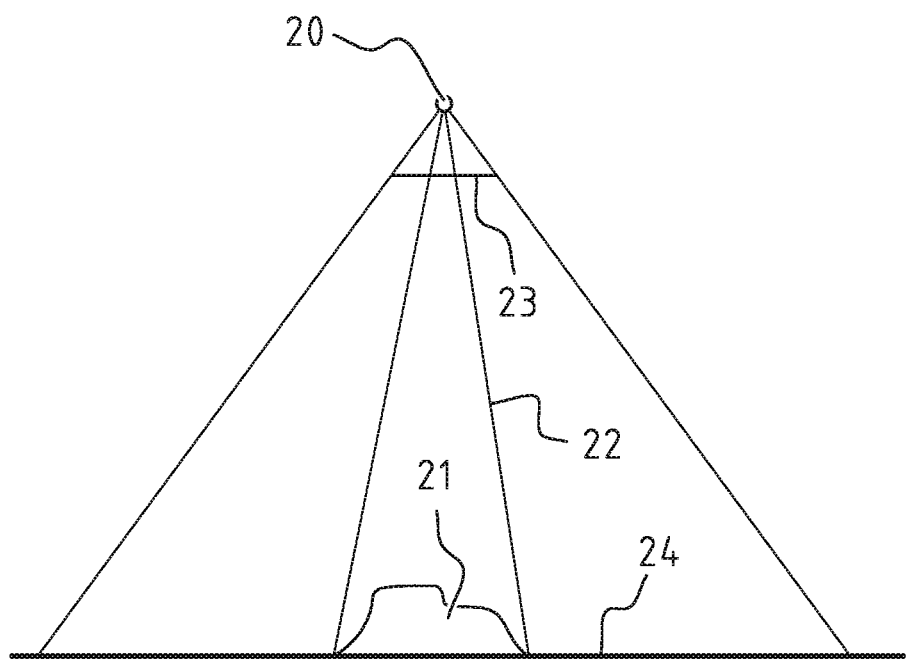
FIG. 4 illustrates constructing a fictional aerial image using the 3D model of the overlapping region.

Each vertex in the 3D model has a given position relative to an origin. This same origin can be used as a reference for the aerial images. This situation is depicted in FIG. 4. Here, the entrance pupil 20 of the airplane mounted camera is schematically indicated, together with 3D model 21. Projecting lines 22 are drawn that extend from the vertices to entrance pupil 20. A fictional aerial image can be found at the point where these lines intersect with image plane 23. It is noted that the orientation of the camera in FIG. 4 is perpendicular to ground 24. However, the invention is equally applicable to other orientations.

The fictional aerial image normally comprises only information related to 3D model 21. In other words, large portions of the fictional aerial image do not comprise information as these portions correspond to regions on the ground for which a 3D model has not been constructed.

Figure 5A:
FIGS. 5A-5B illustrate an actual aerial image and a fictional aerial image, respectively.
Figure 5B:
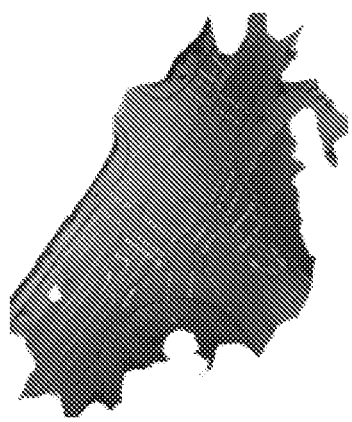

As a next step, the fictional aerial image is compared to the actual aerial image. FIGS. 5A-5B illustrate an actual aerial image and a fictional aerial image, respectively. It can be seen that the fictional aerial image, and therefore the underlying 3D model, mostly comprises information about the roads. Using a road surface offers the possibility to obtain a large continuous object that is easily detectable in aerial images.

If the position and orientation information of the 3D model is correct, as is the position and orientation information of the aerial image, the fictional aerial image would not display a positional offset relative to the actual aerial image. In practice however, such offset can be observed.

In accordance with the invention, a difference is determined between the fictional aerial image and the actual aerial image. This difference may be determined in various ways. As a first example, an average positional shift can be determined of the fictional aerial image relative to the actual aerial image. To this end, pixel (block) matching techniques may be used that determine a shift between corresponding pixels or pixel blocks in both images. To determine whether pixels or pixel blocks match, the color information of the pixels or pixel blocks in both images can be compared. Information of surrounding pixels may also be taken into account. Alternatively or additionally, features may be identified of image elements or objects that are visible in both images, such as edges. A shift in position of these features of one image relative to the other image can be determined.

As a second example of determining a difference between the fictional aerial image and the actual aerial image, pixels in similar positions in the images may be compared. For instance, difference in color coordinate values, such as RGB values, and/or light intensity can be determined.

An overall error can be found by squaring and summing the differences. The skilled person readily understands that many other options exist for determining a difference between the fictional aerial image and the actual aerial image.

Having established a difference, the position of the 3D model can be updated by adding a positional offset to the 3D model. In case the difference comprises a shift between the fictional aerial image and the actual aerial image, the position of the 3D model can be updated such that this shift is no longer present or strongly minimized when generating a new fictional aerial image using the 3D model having the updated position.

Alternatively or additionally, an optimization algorithm may be used to minimize the differences between the fictional aerial image and the actual aerial image. To this end, an error is computed based on the determined difference. In an embodiment the error is identical to the difference. The optimization algorithm comprises updating the position of the 3D model and re-calculating the error, now using the fictional aerial image that is obtained using the 3D model having the updated position. This process can be repeated until the error is below a given threshold. In other embodiments, a range of possible positional shifts is tried, and the final position of the 3D model is that position which yields the lowest error.

In the above, a single aerial image was used to determine the error. However, it is equally possible to use plurality of aerial images. Then, differences may be determined between respective fictional aerial images and each of the actual aerial images. An overall error may then be determined that depends on the various differences. In an optimization algorithm, the position of the 3D model may be determined by minimizing the overall error.

Figure 6:
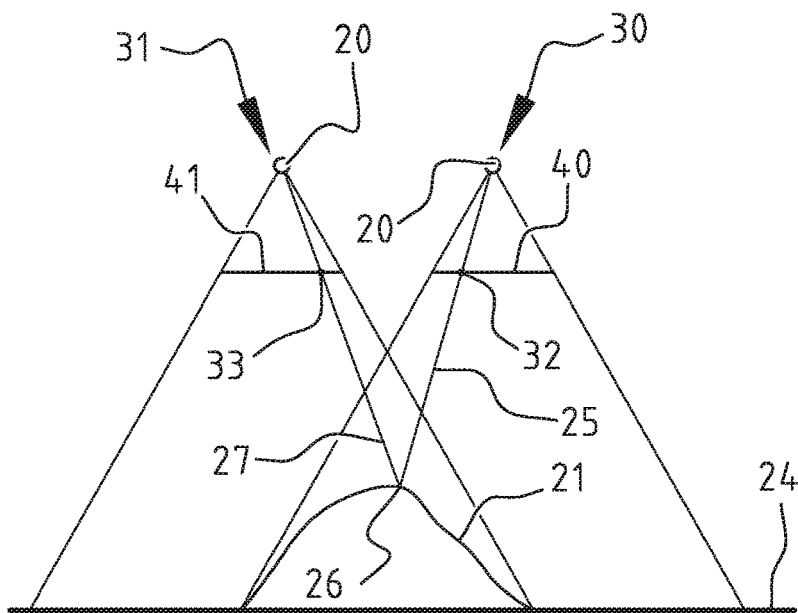
FIG. 6 illustrates the projection of an aerial image into another aerial image via the 3D model.

FIG. 6 illustrates another way of determining whether the position of the 3D model corresponds to the actual aerial images. Here, 32 denotes a point in the actual aerial image shown at image plane 40 obtained using the camera at position 30. A projecting line 25 can be drawn that extends from entrance pupil 20 at position 30 through point 32 towards 3D model 21. Projecting line intersects 3D model 21 at point 26. From point 26, a further projecting line 27 can be drawn that extends to entrance pupil 20 at position 31. This latter line intersects image plane 41 at point 33.

In case, the position information of 3D model 21 is correct, than the pixel at point 32 in the actual aerial image shown at image plane 40 obtained with a camera at position 30 corresponds to the pixel at point 33 in the aerial image shown at image plane 41 obtained with a camera at position 31. In other words, the projection of aerial image 40 obtained with a camera at position 30 via 3D model 21 into the aerial image shown at image plane 41 obtained with a camera at position 31 should result in a projected aerial image that shows no shift relative to aerial image shown at image plane 41 obtained with a camera at position 30. In practice however, positional shifts of 3D model 21 exist.

Unlike projecting 3D model 21 to construct a fictional aerial image as described earlier, the projection of one aerial image into another is more sensitive to errors in the vertical (z) coordinate of 3D model 21. More in particular, this latter projection provides a relatively small error term if the z coordinate is correct even if the horizontal coordinates x and y are not. This is due to the fact that the 3D model mostly comprises a horizontal ground plane. Shifting in the x and y directions therefore does not introduce large errors when projecting one aerial image into another aerial image.

An algorithm can be constructed for finding the optimum position of 3D model 21 using the abovementioned projecting of aerial images. To this end, similar techniques can be used for determining differences between the actual aerial image and the projected aerial image and for constructing an error that is to be minimized.

It is possible to extend the algorithm to multiple aerial images. In such case, a reference aerial image may be chosen. The other aerial images can then be projected into the reference aerial image or vice versa. For each projection an error may be determined, which errors can later be combined to find an overall error to be minimized.

In a further embodiment, both algorithms described above are combined. As an example, consider n aerial images with n larger than 1. In this case, the following error function $\Delta$ can be constructed:

$$\Delta = \sum_{k=0}^{n} |\Delta_{k \to ref, k \neq ref}| + |\Delta_{3D \to k}|$$

wherein $\Delta_{k \to ref}$ indicates the error determined when projecting aerial image k into the reference aerial image, not being aerial image k, and wherein $\Delta_{3D \to k}$ indicates the error determined when projecting the 3D model into aerial image k.

Overall error function $\Delta$ can be minimized by varying the positional offset of 3D model 21 and by comparing the error function to a predetermined threshold. Alternatively, a local or global minimum is found for the error function in a given position range of 3D model 21.

Combining the algorithm comprising the construction of the fictional aerial image, which algorithm is sensitive to errors in the x and y coordinate, with the algorithm comprising the mutual projection of aerial images, which algorithm is sensitive to errors in the z coordinate, provides a relatively robust algorithm.

It may be advantageous to use the first mentioned optimization algorithm, using only the projection of the 3D model into the aerial image(s) to find a suitable starting position of the positional offset of 3D model for the mixed optimization algorithm described above.

Figure 7:
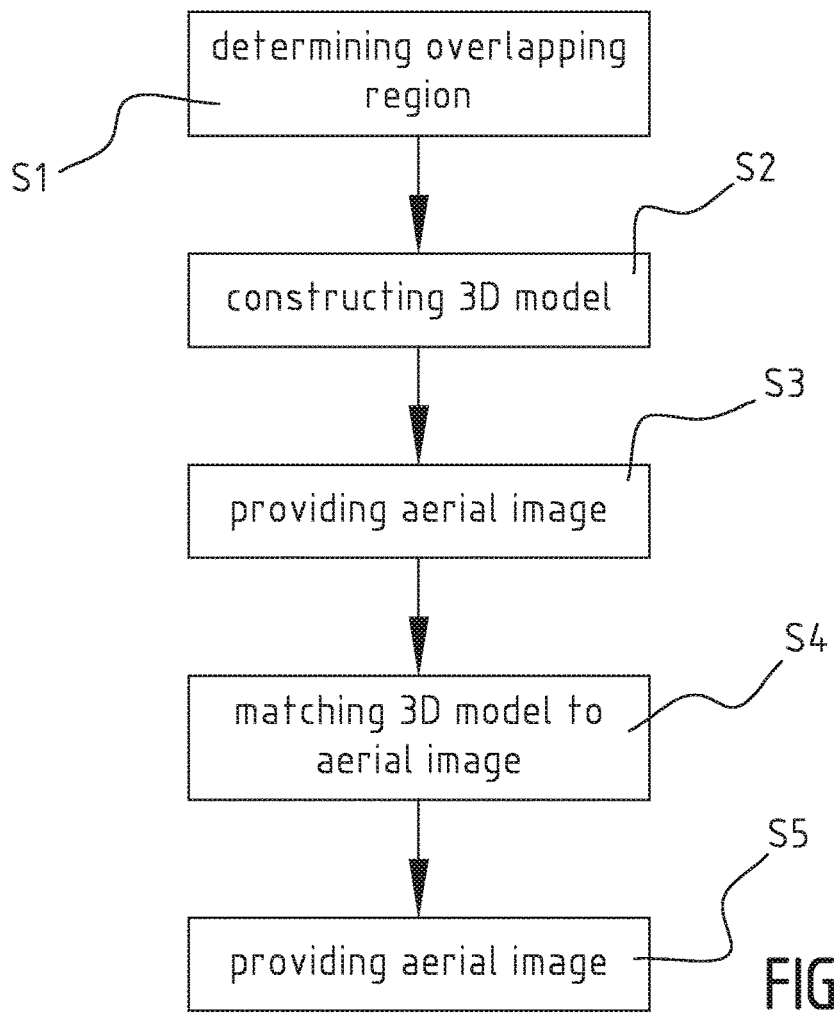
FIG. 7 illustrates an exemplary method in accordance with the present invention.

FIG. 7 illustrates an exemplary method in accordance with the present invention. This method is suitable for improving position information associated with a collection of images, wherein the images in the collection have been obtained using a camera that was positioned at different positions along a trajectory, each of the obtained images being associated with a respective first position and respective first orientation, representing a position and orientation of the camera with which the image was taken.

In step S1, an overlapping region is determined in which at least two images obtained at different positions among the collection of images at least partially overlap. Then, in step S2, a 3D model of the overlapping region is constructed using triangulation. Next, an aerial image is provided in step S3 in which the overlapping region is at least partially visible, the aerial image being associated with a second position and second orientation representing a position and orientation of a camera with which the image was taken. A positional offset of the 3D model is then determined in step S4 by matching the 3D model to the aerial image. In step S5, the respective first positions of the collection of images are updated using the determined positional offset and the method ends.

After having improved the position information of the images in the collection, the position information of other images, which have not contributed to the optimization process, can be improved as well using known techniques such as bundle adjustment.

The skilled person understands that the method described in conjunction with FIG. 7 can be modified by any of the steps mentioned before. Moreover, the skilled person understands that various modifications are possible to the embodiments and methods discussed above without deviating from the scope of the invention which is defined by the appended claims.

For instance, the description above states that the collection of images is formed by providing a vehicle having a vehicle-mounted camera and moving the vehicle along a given trajectory while obtaining images. However, the present invention does not exclude that the collection of images is obtained in a different manner. For instance, the collection may refer to a collection of images obtained by camera-equipped mobile terminals, such as smart phones, having a positioning system. In general, any image having a known position and orientation can be used as long as this image has an overlap with another image in the same collection. The invention is particularly related to situations wherein the overlapping region can be construed using the overlaps between different pairs of images, wherein the overlap between a first pair overlaps with the overlap between a second pair. As an example, assume a collection of N images $I_n$ (n=1 ... N), wherein each image $I_n$ with N>n>1 has an overlap with images $I_{n-1}$ and $I_{n+1}$. Moreover, the overlap between images $I_n$ and $I_{n-1}$ overlaps with the overlap between images $I_n$ and $I_{n+1}$. In this way, the overlapping region can be formed as a large continuous structure of overlaps.

The invention claimed is:

1. A method for improving position information associated with a collection of images, wherein the images in the collection have been obtained using a camera that was positioned at different positions along a trajectory, each of the obtained images being associated with a respective first position and respective first orientation, representing a position and orientation of the camera with which the image was taken, the method comprising:
    determining an overlapping region in which at least two images obtained at different positions of the vehicle among the collection of images at least partially overlap, the overlapping region comprising graphical information about objects that are visible in said at least two images;
    constructing a 3D model of the objects that are visible in the overlapping region using triangulation;
    providing an aerial image in which the objects visible in the overlapping region are at least partially visible, the aerial image being associated with a second position and second orientation representing a position and orientation of a camera with which the image was taken;
    determining a positional offset of the 3D model relative to the aerial image; and
    updating a respective first position of the at least two images in the collection using the determined positional offset;
wherein the overlapping region comprises:
    a first overlap between a first image and a second image that correspond to adjacent positions of the vehicle along the trajectory;
    a second overlap between the second image and a third image that correspond to adjacent positions of the vehicle along the trajectory, the first and second images being different images; and
    wherein the first overlap partially overlaps the second overlap.

2. The method according to claim 1, wherein determining the positional offset comprises:
    assigning a temporary positional offset to the 3D model;
    constructing a fictional aerial image using the 3D model based on the second position and second orientation;
    determining a first difference between the fictional aerial image and the aerial image;
    calculating an error based on the determined first difference;
    changing the temporary positional offset and repeating the previous steps until the error is below a predefined threshold or until a global or local minimum for the error is found; and
    setting the resulting temporary positional offset as the positional offset of the 3D model.

3. The method according to claim 2, further comprising providing a plurality of aerial images.

4. The method according to claim 3, wherein the step of constructing the fictional aerial image using the 3D model based on the second position and second orientation is performed for each of the plurality of aerial images, and wherein the step of determining the first difference between the fictional aerial image and the aerial image is performed for each of the aerial images, and wherein the error is calculated based on the accumulated first differences.

5. The method according to claim 4, wherein determining the positional offset further comprises:
    selecting one aerial image among the aerial images as a reference aerial image;
    projecting the reference aerial image via the 3D model into the other aerial images to construct one or more projected images or projecting the other aerial images via the 3D model in the reference aerial image to construct one or more projected images;
    determining a respective second difference between each of the projected images and the image that was projected into;
    wherein said calculating the error comprises calculating the error based on the accumulated determined first and second differences.

6. The method according to claim 1, wherein determining the positional offset comprises:
    assigning a temporary positional offset to the 3D model;
    projecting the aerial image onto the 3D model;
    determining a first difference between the projected aerial image and the 3D model;
    calculating an error based on the determined first difference;
    changing the temporary positional offset and repeating the previous steps until the error is below a predefined threshold or until a global or local minimum for the error is found; and
    setting the resulting temporary positional offset as the positional offset of the 3D model.

7. The method according to claim 6, further comprising providing a plurality of aerial images, wherein the step of projecting the aerial image onto the 3D model is performed for each of the plurality of aerial images, and wherein the step of determining the first difference between the projected aerial image and the 3D model is performed for each of the aerial images, and wherein the error is calculated based on the accumulated first differences.

8. The method according to claim 7, wherein determining the positional offset further comprises:
- selecting one aerial image among the aerial images as a reference aerial image;
- projecting the reference aerial image via the 3D model into the other aerial images to construct one or more projected images or projecting the other aerial images via the 3D model in the reference aerial image to construct one or more projected images;
- determining a respective second difference between each of the projected images and the image that was projected into;
- wherein said calculating the error comprises calculating the error based on the accumulated determined first and second differences.

9. The method according to claim 1, further comprising:
forming the collection of images using the steps of:
providing a vehicle having a vehicle-mounted camera;
moving the vehicle along a given trajectory while obtaining respective images at different positions of the vehicle along the trajectory, each of the obtained images being associated with a respective first position and a respective first orientation, representing a position and an orientation of the camera with which the image was taken.

10. The method according to claim 9, further comprising:
determining, using a first positioning system, the position of the vehicle-mounted camera while moving the vehicle along the trajectory; and
determining, using a second positioning system, the position of the camera that is used to obtain the aerial image.

11. The method according to claim 10, wherein an accuracy of position information obtained using the first positioning system is lower than an accuracy of position information obtained using the second positioning system.

12. The method according to claim 10, wherein the first positioning system and/or the second positioning system comprises at least one of a global navigation satellite system (GNSS) system, an inertial navigation system, or a vehicle wheel rotation measurement system.

13. The method according to claim 1, wherein the overlapping region corresponds to a road or ground.

14. The method according to claim 13, wherein the overlapping region further comprises building facades.

15. The method according to claim 1, wherein constructing the 3D model comprises:
- identifying a corresponding image element in at least two images among the collection of images;
- determining a position of the identified image element using triangulation based on the respective first positions and first orientations associated with the at least two images;
- assigning the identified image element to one or more vertices of a mesh;
- assigning a texture or color to vertices of the mesh or to polygons of the mesh using the texture or color of the corresponding image element.

16. The method according to claim 1, wherein the images in the collection of images are panoramic images, having a field of view of 180 degrees or higher in the horizontal plane.

17. The method according to claim 1, further comprising performing a bundle adjustment on the images in the collection to adjust relative positions of the images prior to constructing the 3D model.

18. A device for implementing the method as defined in claim 1, said device comprising:
- a memory for holding the collection of images and said at least one aerial image;
- a processor configured to perform said method.

19. A non-transitory computer readable medium on which computer readable instructions are stored which, when executed by a computer, cause the execution of the method as defined in claim 1.

* * * * *